(12) United States Patent
Takagi et al.

(10) Patent No.: US 9,021,907 B2
(45) Date of Patent: May 5, 2015

(54) RANGE SENSING APPARATUS

(75) Inventors: Akira Takagi, Obu (JP); Mikio Kanefusa, Chita-gun (JP); Shigeki Hirakawa, Kariya (JP); Takahiro Kimura, Hiroshima (JP); Akihiro Mitani, Higashihiroshima (JP); Shotaro Nagai, Hiroshima (JP); Keiichiro Sueshige, Hiroshima (JP); Takenori Kawano, Hiroshima (JP)

(73) Assignees: Denso Corporation, Kariya (JP); Mazda Motor Corporation, Hiroshima (JP)

( * ) Notice: Subject to any disclaimer, the term of this patent is extended or adjusted under 35 U.S.C. 154(b) by 946 days.

(21) Appl. No.: 13/171,821

(22) Filed: Jun. 29, 2011

(65) Prior Publication Data
US 2012/0000309 A1    Jan. 5, 2012

(30) Foreign Application Priority Data
Jun. 30, 2010   (JP) ................. 2010-149502

(51) Int. Cl.
| B60K 20/00 | (2006.01) |
| F16H 59/70 | (2006.01) |
| G01D 5/249 | (2006.01) |
| G01D 11/24 | (2006.01) |
| F16H 59/10 | (2006.01) |

(52) U.S. Cl.
CPC ............. *F16H 59/70* (2013.01); *F16H 59/105* (2013.01); *G01D 5/2497* (2013.01); *G01D 11/24* (2013.01)

(58) Field of Classification Search
CPC .... G01D 11/24; G01D 5/2497; F16H 59/105; F16H 59/70

USPC ............ 74/473.1, 335; 701/51, 54, 58, 61, 65
See application file for complete search history.

(56) References Cited

U.S. PATENT DOCUMENTS

| 6,717,417 | B2 | 4/2004 | Jungbauer et al. |
| 2002/0089336 | A1 | 7/2002 | Jungbauer et al. |
| 2006/0093169 | A1* | 5/2006 | Takahashi et al. ............ 381/182 |
| 2008/0276738 | A1* | 11/2008 | Kozaki et al. .................. 74/335 |

(Continued)

FOREIGN PATENT DOCUMENTS

| JP | 2002-175744 | 6/2002 |
| JP | 2008-144798 | 6/2008 |
| JP | 2008-163985 | 7/2008 |

OTHER PUBLICATIONS

Office Action (1 page) dated Nov. 12, 2013, issued in corresponding Japanese Application No. 2010-149502 and English translation (2 pages).

(Continued)

*Primary Examiner* — William Kelleher
*Assistant Examiner* — Zakaria Elahmadi
(74) *Attorney, Agent, or Firm* — Nixon & Vanderhye P.C.

(57) ABSTRACT

A housing slidably guides a slider, which is driven in response to selection of a shift range of an automatic transmission. Upper and lateral sides of a movable range of the slider are covered with the housing. Thereby, application of hydraulic fluid and foreign objects to guide rails is limited to limit malfunction of the slider. Furthermore, even when the hydraulic fluid and foreign objects adhere to the guide rails, the hydraulic fluid and foreign objects can be collected at ends of the movable range of the slider and can be expelled to an outside of the housing through open ends of the housing.

8 Claims, 12 Drawing Sheets

(56) References Cited

U.S. PATENT DOCUMENTS

| | | | |
|---|---|---|---|
| 2009/0000411 A1* | 1/2009 | Nakayama et al. | 74/335 |
| 2009/0120222 A1* | 5/2009 | Kimura et al. | 74/335 |
| 2012/0000309 A1* | 1/2012 | Takagi et al. | 74/473.1 |
| 2012/0137810 A1* | 6/2012 | Kim et al. | 74/473.1 |
| 2013/0110364 A1* | 5/2013 | Yamada et al. | 701/61 |
| 2013/0110365 A1* | 5/2013 | Kimura et al. | 701/65 |

OTHER PUBLICATIONS

Office Action (6 pages) dated Apr. 30, 2014, issued in corresponding Chinese Application No. 201110186006.9 and English translation (7 pages).

German Office Action dated Jan. 30, 2012, issued in corresponding German Application No. 10 2011 106 012.3 with English Translation.

Bosch, "Elektronische Getriebesteuerung" (Electronic Gearbox Control) EGS., $1^{st}$ Edition, Konstanz: Christiani 2004 (Yellow Series), P. 60—ISBN 3-7782-2027-6, with English translation (each 3 pages).

Office Action (6 pages) dated Sep. 22, 2013, issued in corresponding Chinese Application No. 201110186006.9 and English translation (6 pages).

Examination Report issued in corresponding German Patent Application No. 102011106012.3 dated Jan. 9, 2015 (with translation).

* cited by examiner

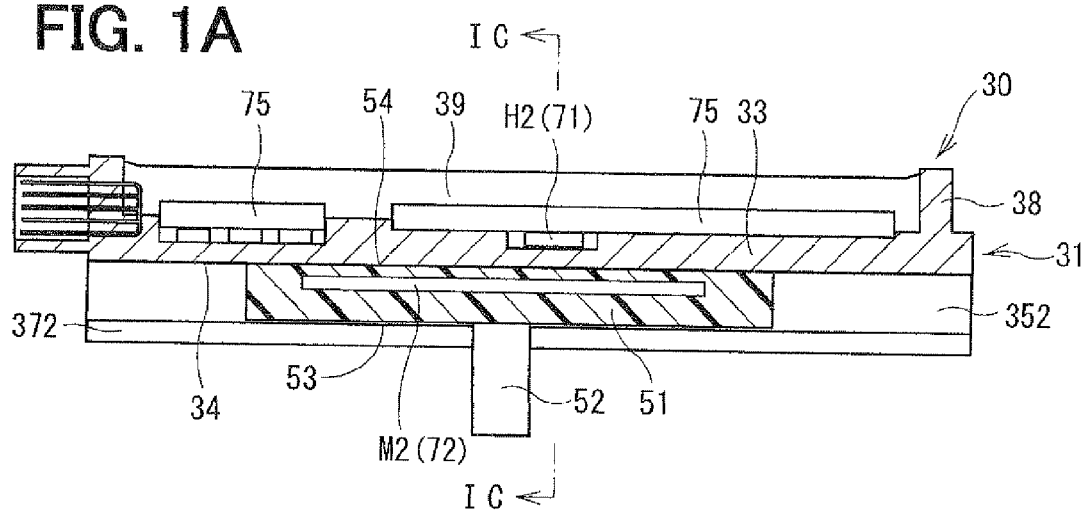
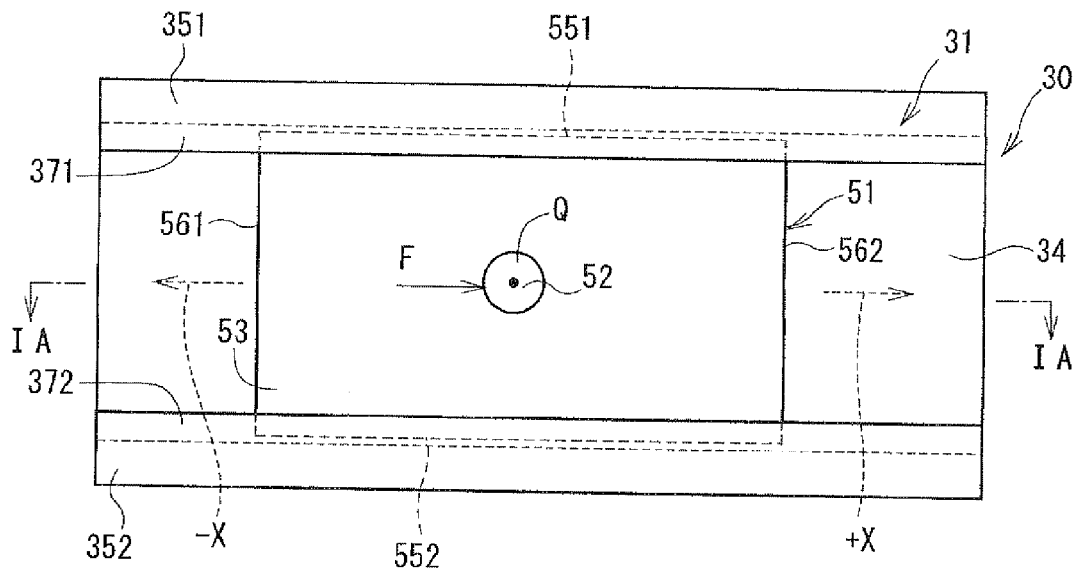
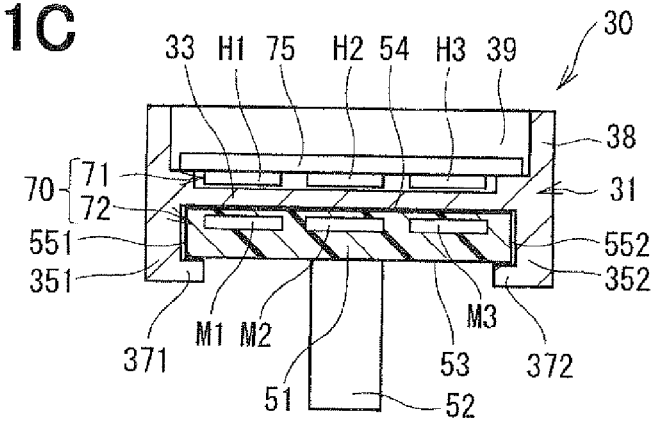

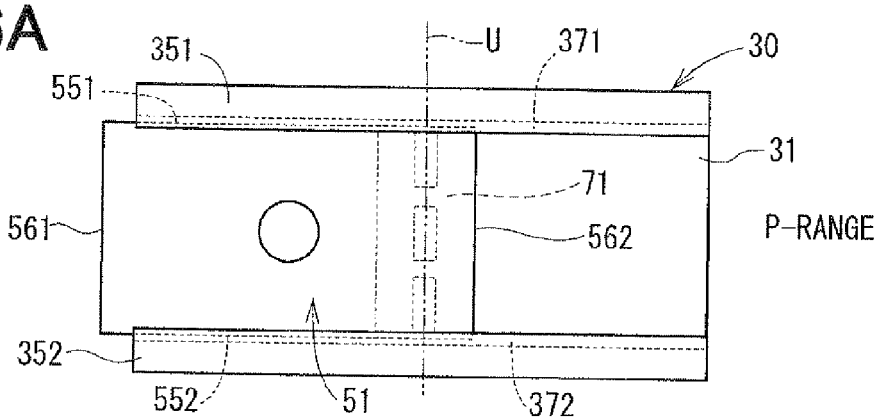
FIG. 6A — P-RANGE
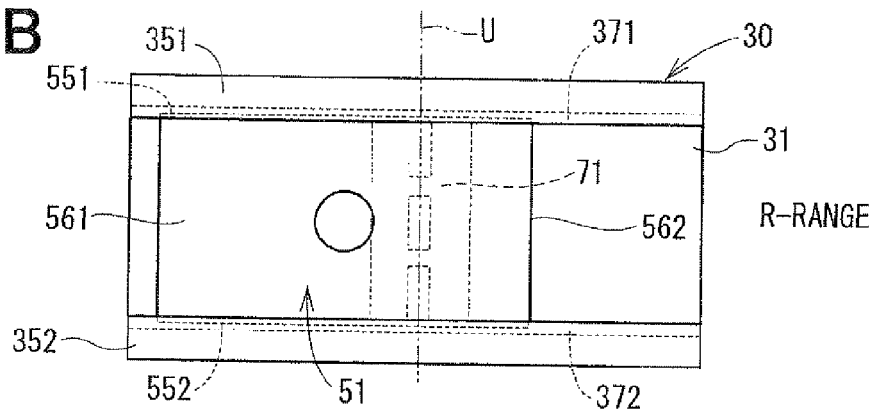
FIG. 6B — R-RANGE
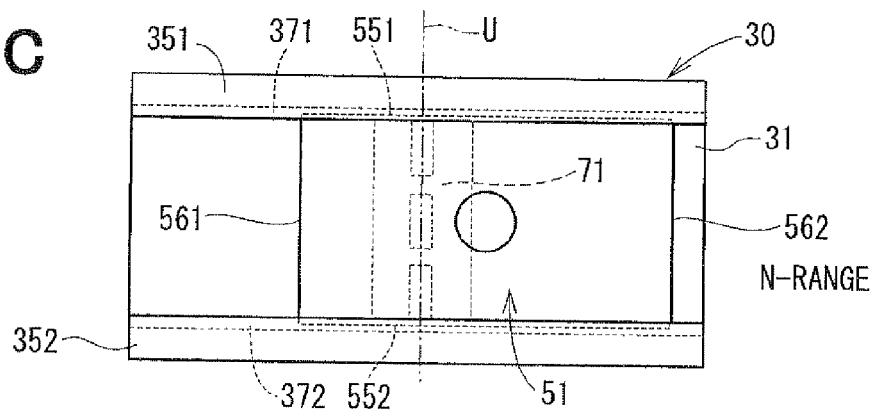
FIG. 6C — N-RANGE
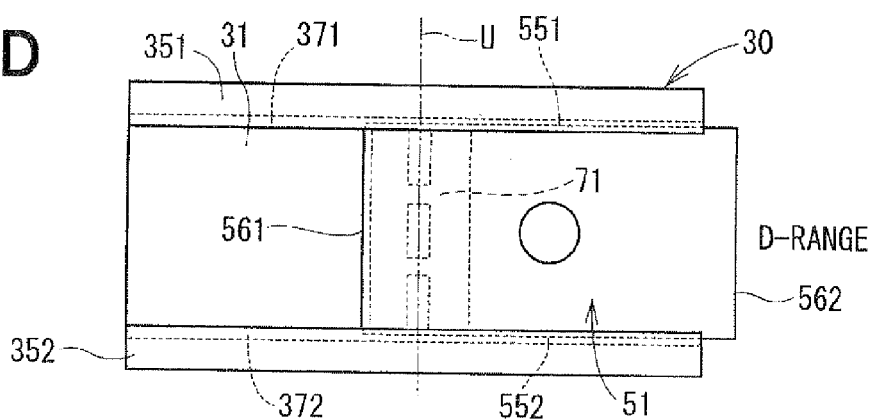
FIG. 6D — D-RANGE

|    | P | (P-R) | R | (R-N) | N | (N-D) | D |
|----|---|-------|---|-------|---|-------|---|
| H1 | ○ | ○     |   |       |   | ○     | ○ |
| H2 |   | ○     | ○ | ○     |   |       | ○ |
| H3 |   |       |   | ○     | ○ | ○     | ○ |

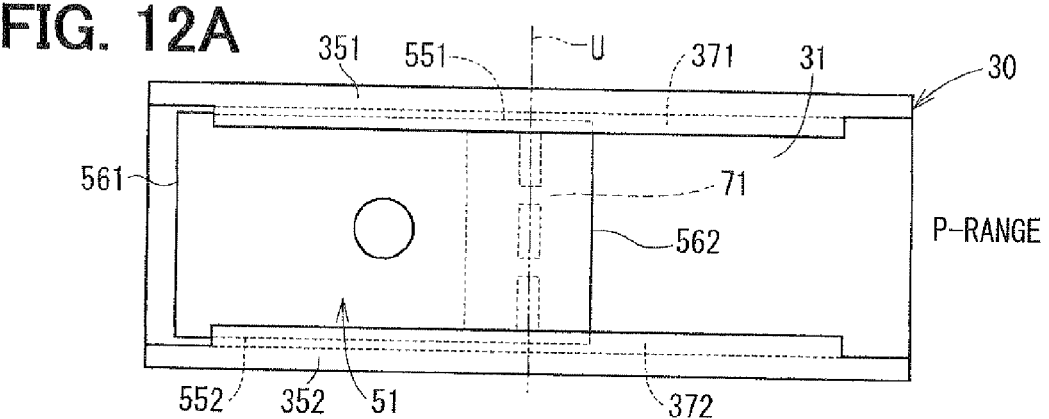
FIG. 12A — P-RANGE
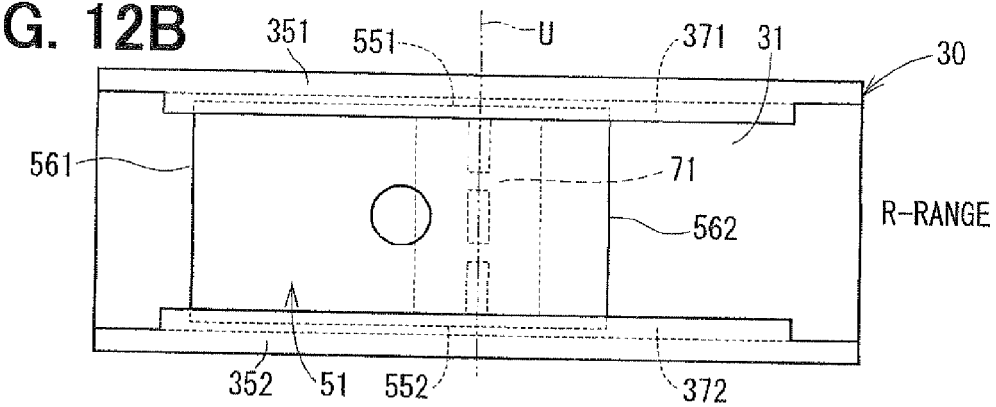
FIG. 12B — R-RANGE
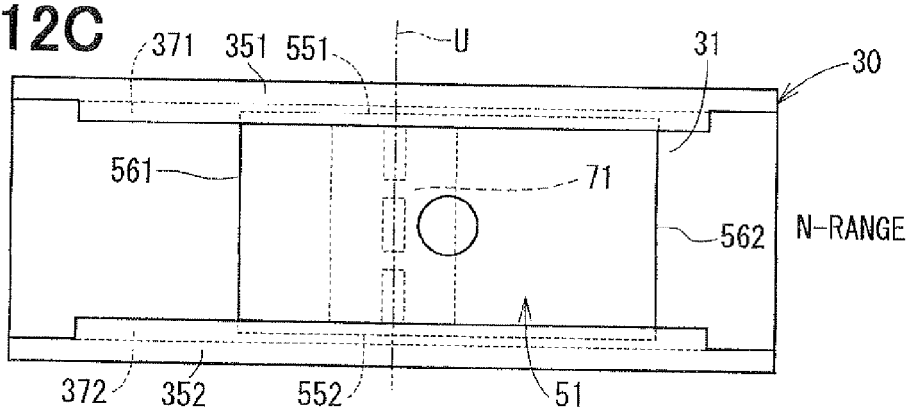
FIG. 12C — N-RANGE
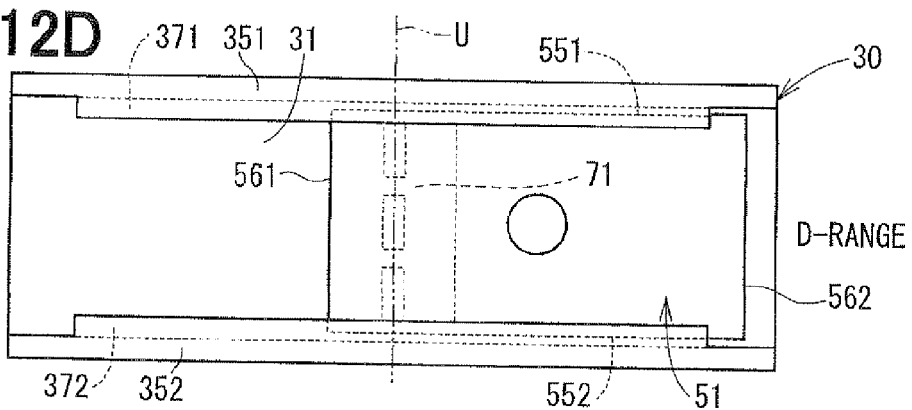
FIG. 12D — D-RANGE

|  | P | (P-R) | R | (R-N) | N | (N-D) | D |
|---|---|---|---|---|---|---|---|
| E1 | ○ | ○ |  |  |  | ○ | ○ |
| E2 |  | ○ | ○ | ○ |  |  | ○ |
| E3 |  |  |  | ○ | ○ | ○ | ○ |
| E4 | ○ | ○ | ○ | ○ | ○ | ○ | ○ |

RANGE SENSING APPARATUS

CROSS REFERENCE TO RELATED APPLICATION

This application is based on and incorporates herein by reference Japanese Patent Application No. 2010-149502 filed on Jun. 30, 2010.

BACKGROUND OF THE INVENTION

1. Field of the Invention

The present invention relates to a range sensing apparatus of an automatic transmission.

2. Description of Related Art

A range sensing apparatus, which senses a shift range of an automatic transmission, is known. For instance, in a range sensing apparatus recited in Japanese Unexamined Patent Publication No. 2002-175744A or Japanese Unexamined Patent Publication No. 2006-118643A (corresponding to US2006/0093169A1), the shift range of the automatic transmission is sensed with a sensor, which is provided in a housing, based on a moving position (operational position) of a slider, which is driven to reciprocate along guide rails of a housing in response to the selection of the shift range.

The range sensing apparatus recited in Japanese Unexamined Patent Publication No. 2002-175744A or Japanese Unexamined Patent Publication No. 2006-118643A (corresponding to US2006/0093169A1) is placed in a transmission case, in which hydraulic fluid (oil) of the automatic transmission is sprayed. Therefore, the hydraulic fluid of the automatic transmission, which flows downward to the range sensing apparatus, may enter into a movable range of the slider. The hydraulic fluid of the automatic transmission may possibly contain foreign objects (e.g., debris left at the time of forming a component of the automatic transmission or metal powder generated through frictional wearing of the component). When the hydraulic fluid of the automatic transmission, which contains the foreign objects, adheres to a sliding surface of the slider, malfunction of the slider and thereby malfunction of the range sensing apparatus may occur.

In the range sensing apparatus recited in Japanese Unexamined Patent Publication No. 2002-175744A, the sensor, which senses the shift range, is provided to a wall surface of a vertical wall. Therefore, an input shaft, which is connected to the slider that is movable in a horizontal direction along the vertical wall, projects in the horizontal direction, which is perpendicular to the wall surface of the vertical wall. Thus, a slit, through which the input shaft projects from the housing, is formed in the housing such that an opening of the slit extends in the horizontal direction. An upper peripheral edge of the opening of the slit projects further from a lower peripheral edge of the opening of the slit toward the outside of the housing. Thereby, the hydraulic fluid, which is applied to the opening of the slit from the upper side of the opening of the slit, can be blocked by the upper edge of the opening of the slit to limit the intrusion of the hydraulic fluid into the movable range of the slider. In addition, holes, which communicate between an inside and the outside of the housing, are provided in a lower part and an end part, respectively, of the movable range of the slider in the housing. Thereby, the hydraulic fluid and foreign objects, which enter into the movable range of the slider, can be expelled to the outside of the housing through the holes upon the reciprocation of the slider.

In Japanese Unexamined Patent Publication No. 2006-118643A (corresponding to US2006/0093169A1), the sensor, which senses the moving position of the slider, is placed on the lower side of the slider and faces the upper side where the slider is located, and the slider is supported by the guide rails of the housing from the lower side of the slider. The downwardly moving hydraulic fluid and foreign objects may enter the movable range of the slider. However, due to the reciprocating movement of the slider, the hydraulic fluid and foreign objects are collected by a front end part of the slider, which is located on the front side in the moving direction of the slider. Then, the hydraulic fluid and foreign objects are expelled to the outside of the housing through holes, which are provided to the lower guide rail.

In the case of Japanese Unexamined Patent Publication No. 2002-175744A, the intrusion of the downwardly moving hydraulic fluid into the movable range of the slider can be limited. However, the hydraulic fluid, which is applied from the lateral side, may not be sufficiently limited, and the expelling of the foreign objects through the holes, which are provided in the lower portion and the end portion, respectively, of the movable range of the slider in the housing, may not be sufficient in some cases depending on a size of the foreign objects. Furthermore, the projection of the upper edge of the opening of the slit may be implemented by providing a separate cover to the upper edge of the opening of the slit or by bending the upper edge of the opening of the slit. However, this will result in an increase in the number of the components or an increase in the processing costs.

When a large quantity of the hydraulic fluid and foreign objects move downward in the case of Japanese Unexamined Patent Publication No. 2006-118643A (corresponding to US2006/0093169A1), it may possibly result in a sliding malfunction of the slider. Also, a sufficiently effective expelling of the foreign objects may not be achieved unless providing a sufficiently large size of the holes, through which the foreign objects are expelled. In addition, in the case where the multiple holes are formed in the guide rail, it will require a complicated process, so that the manufacturing costs may be disadvantageously increased.

SUMMARY OF THE INVENTION

The present invention addresses the above disadvantages. According to the present invention, there is provided a range sensing apparatus for an automatic transmission. The range sensing apparatus is adapted to be placed in a corresponding location, which is to be exposed to hydraulic fluid in the automatic transmission. The range sensing apparatus includes an input shaft, a slider, a housing and means (hereinafter, referred to as sensing means) for sensing a shift range of the automatic transmission. A manipulation force is applied to the input shaft according to selection of the shift range of the automatic transmission. One end part of the input shaft is fixed to the slider. The slider is adapted to reciprocate together with the input shaft. The housing slidably guides the slider. The sensing means senses the shift range of the automatic transmission based on a relative position between a movable sensor, which is adapted to reciprocate together with the slider, and a stationary sensor, which is provided to the housing. The housing includes a top plate, first and second side plates and first and second guide rails. The top plate covers an upper side of the slider. The first and second side plates project downward from first and second edges, respectively, of the top plate, which extend generally parallel to a moving direction of the slider. The first and second side plates cover first and second lateral sides, respectively, of the slider. The first and second guide rails are provided at lower end parts, respectively, of the first and second side plates to slidably support the slider from a lower side of the slider.

BRIEF DESCRIPTION OF THE DRAWINGS

The invention, together with additional objectives, features and advantages thereof, will be best understood from the following description, the appended claims and the accompanying drawings in which:

FIG. 1A is a cross-sectional view of a range sensing apparatus of a first embodiment of the present invention taken along line IA-IA in FIG. 1B;

FIG. 1B is a plan view of the range sensing apparatus shown in FIG. 1A;

FIG. 1C is a cross-sectional view of the range sensing apparatus taken along line IC-IC in FIG. 1A;

FIGS. 6A to 6D are bottom views of the range sensing apparatus of the first embodiment, showing various operational states of the range sensing apparatus, which correspond to shift ranges, respectively, of the automatic transmission;

FIGS. 12A to 12D are bottom views of the range sensing apparatus of the second embodiment, showing various operational states of the range sensing apparatus, which correspond to shift ranges, respectively, of the automatic transmission;

DETAILED DESCRIPTION OF THE INVENTION

Various embodiments of the present invention will be described with reference to the accompanying drawings.

First Embodiment

FIGS. 1A to 10 show a range sensing apparatus according to a first embodiment of the present invention.

Figure 2:
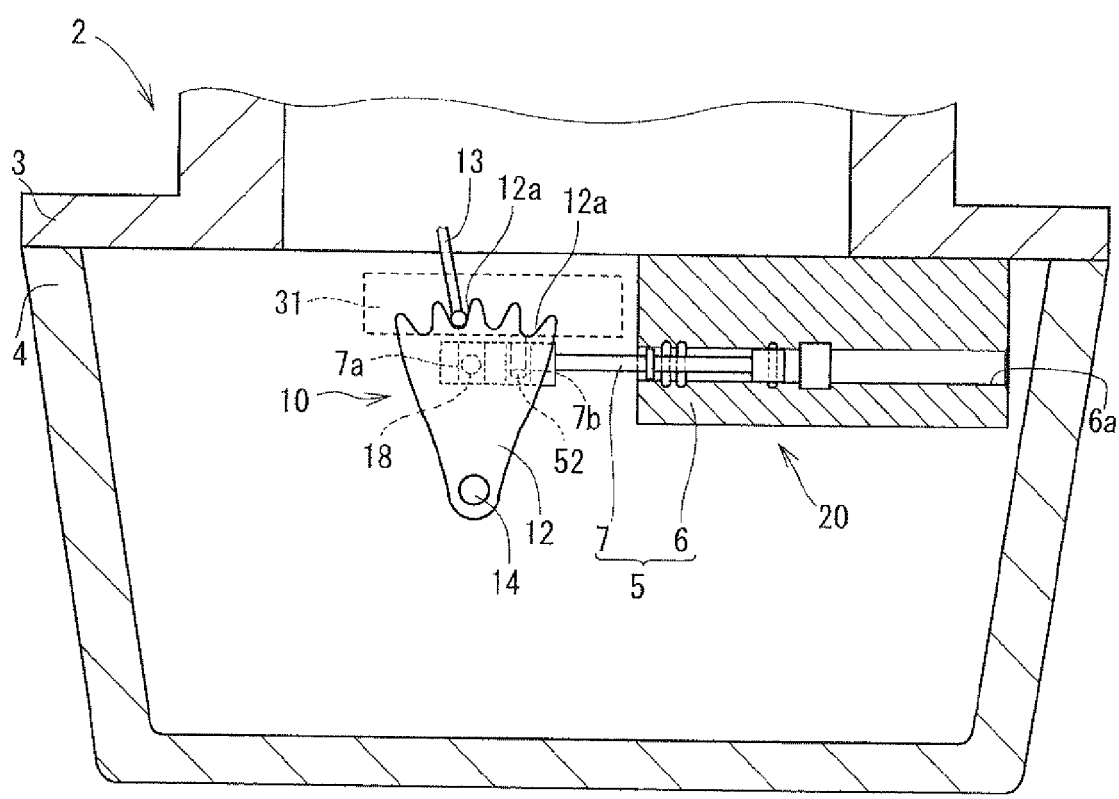
FIG. 2 is a cross-sectional view of an automatic transmission, in which the range sensing apparatus of the first embodiment is applied.

The range sensing apparatus of the present embodiment is applied to an automatic transmission of a vehicle (e.g., an automobile). As shown in FIG. 2, the automatic transmission 2 includes a transmission case 3, an oil pan 4, a hydraulic pressure control apparatus 20, a detent mechanism 10 and the range sensing apparatus 30.

The transmission case 3 receives a plurality of friction elements, which are engaged or disengaged from each other depending on a hydraulic pressure supplied from the hydraulic pressure control apparatus 20. A shift range of the automatic transmission is changed according to a combination of the engagement or disengagement of the respective friction elements. In the present embodiment, the shift range of the automatic transmission is changed among a P-range, an R-range, an N-range and a D-range. The P-range stands for a parking range, and the R-range stands for a reverse range. Furthermore, the N-range stands for a neutral range, and the D-range stands for a drive range.

The oil pan 4 accumulates the hydraulic fluid (oil) used in the automatic transmission 2. The hydraulic pressure control apparatus 20 and the range sensing apparatus 30 are received in the oil pan 4.

Figure 3:
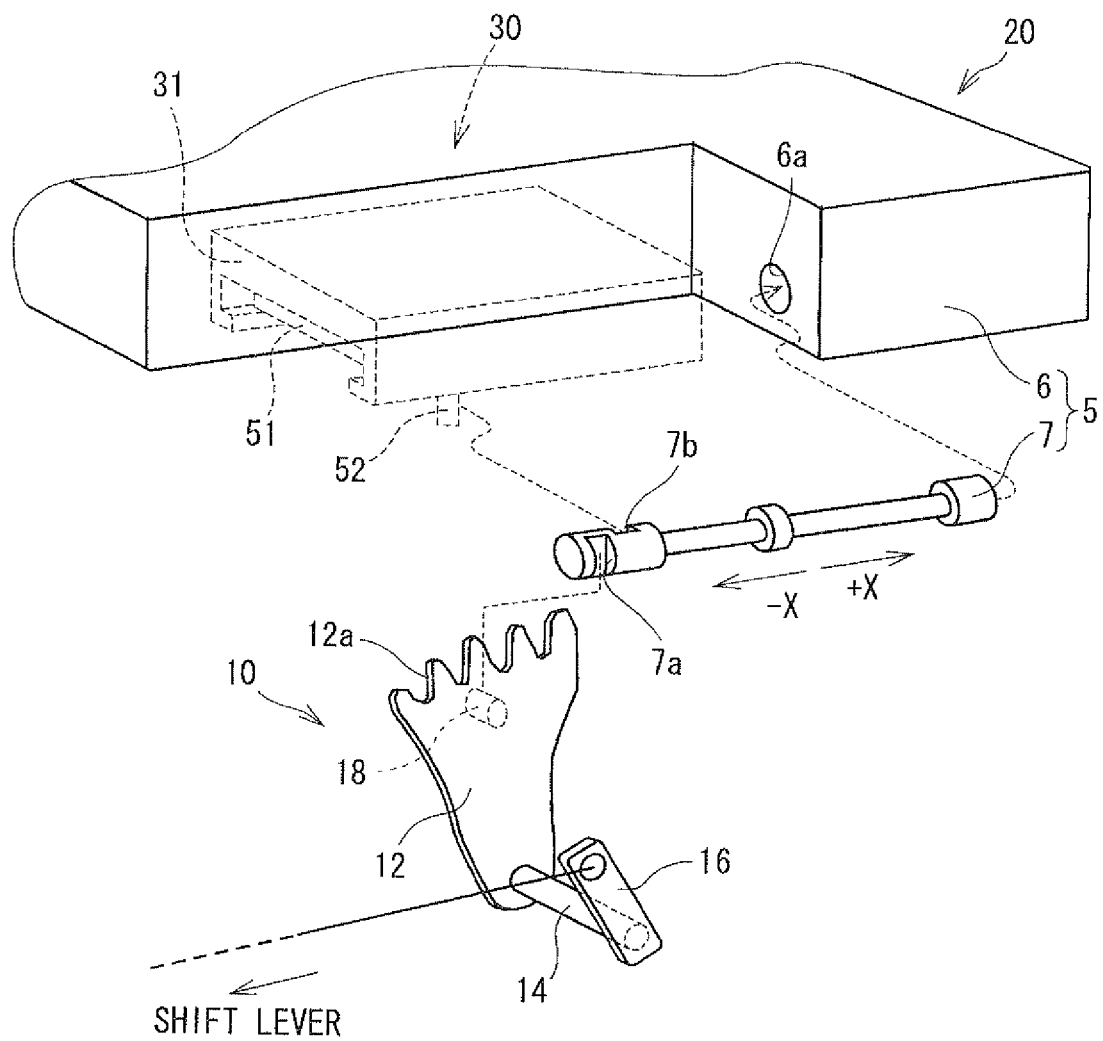
FIG. 3 is an exploded perspective view of the automatic transmission, in which the range sensing apparatus of the first embodiment is applied.
Figure 4A:
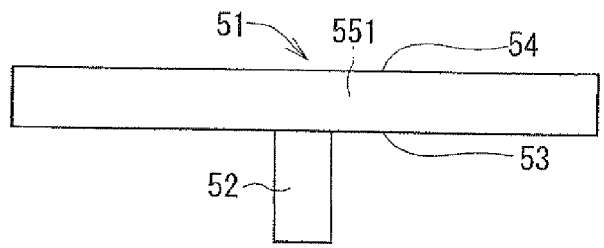
FIG. 4A is a front view of a slider and an input shaft of the first embodiment.
Figure 4B:
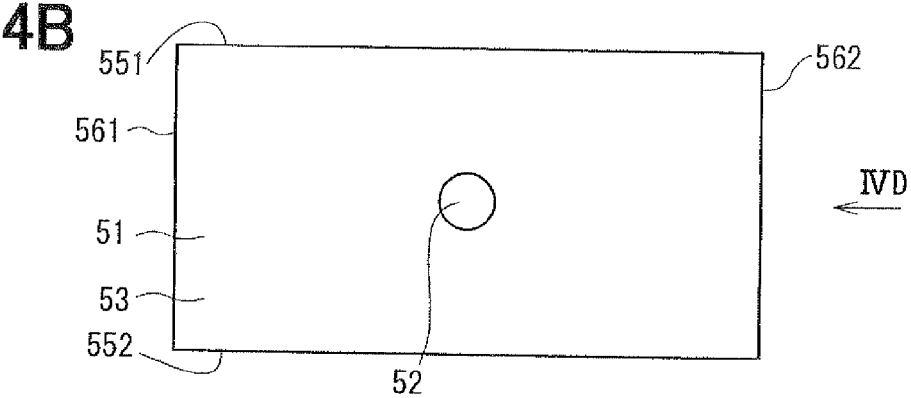
FIG. 4B is a bottom view of the slider and the input shaft of FIG. 4A.
Figure 4C:
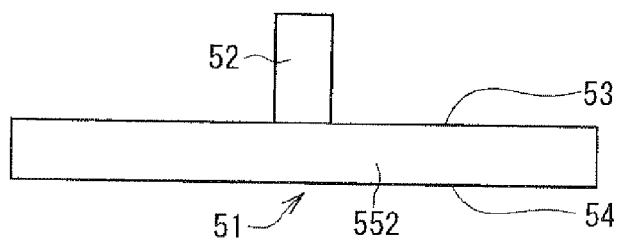
FIG. 4C is a rear view of the slider and the input shaft shown in FIGS. 4A and 4B.
Figure 4D:
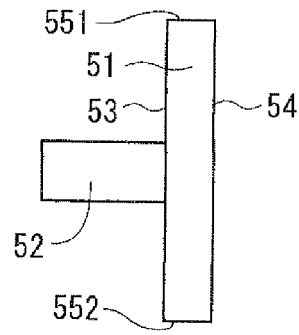
FIG. 4D is a view taken in a direction of an arrow IVD in FIG. 4B.
Figure 4E:
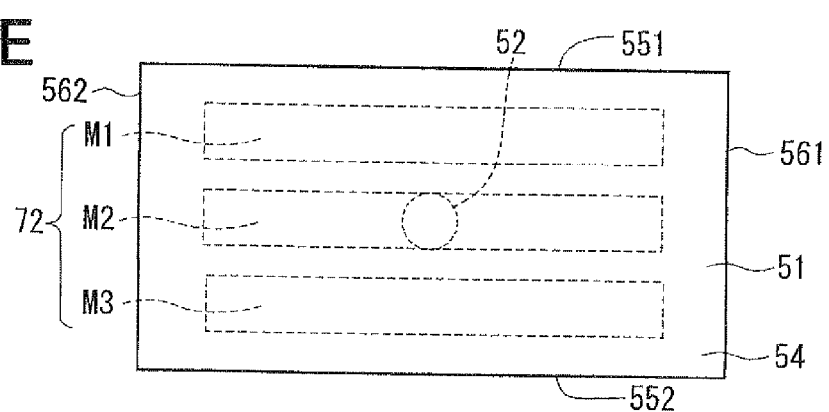
FIG. 4E is a plan view of the slider and the input shaft shown in FIGS. 4A-4D.

As shown in FIGS. 2 and 3, the hydraulic pressure control apparatus 20 includes a plurality of valves (e.g., a manual valve 5) and a hydraulic circuit including a plurality of hydraulic fluid passages. In the manual valve 5, a spool 7 is received in a spool hole 6a of a valve body 6, which is fixed to the transmission case 3, in a manner that enables reciprocating movement of the spool 7 in the spool hole 6a of the valve body 6. The manual valve 5 controls the hydraulic pressure supplied to each corresponding friction element by changing the hydraulic fluid passage of the hydraulic circuit according to a moving position (operational position) of the spool 7. Thereby, the shift range of the automatic transmission is changed to the corresponding range. In the present embodiment, when the spool 7 is moved in a first direction +X shown in FIG. 3, the shift range is changed in an order of the P-range, the R-range, the N-range and the D-range. Furthermore, when the spool 7 is moved in a second direction −X, which is opposite from the first direction +X in FIG. 3, the shift range is changed in an order of the D-range, the N-range, the R-range and the P-range.

The detent mechanism 10 includes a detent plate 12, a detent spring 13, a rotatable shaft 14, a detent lever 16 and an output shaft 18. The detent plate 12 and the detent lever 16 are connected with each other through the rotatable shaft 14. When the detent lever 16 is rotated about the rotatable shaft 14 through manipulation of a shift lever (not shown), the detent plate 12 is rotated.

A plurality of grooves 12a is arranged one after another in the rotational direction of the detent plate 12 along an outer peripheral edge of the detent plate 12. When the detent spring 13 is engaged with a corresponding one of the grooves 12a in response to the rotational position of the detent plate 12, the rotation of the detent plate 12 is limited during a non-manipulation time period of the shift lever, during which the shift lever is not manipulated by a driver (user) of the vehicle.

One end part of the output shaft 18 is fixed to the detent plate 12, and the other end part of the output shaft 18 is engaged with a groove 7a of the spool 7. Therefore, the rotational motion of the detent plate 12 is converted into linear motion of the spool 7 to reciprocate the spool 7 in the axial direction in response to the manipulation of the shift lever.

As shown in FIGS. 1A to 1C, the range sensing apparatus 30, which is configured into a rectangular parallelepiped form, includes a housing 31, a slider 51 and an input shaft 52.

The housing 31 is fixed to the valve body 6. The housing 31 is molded from an oil-resistant resin material, such as polyphenylene sulfide (PPS).

The housing 31 includes a base (top plate) 33, side plates (first and second side plates) 351, 352 and guide rails (first and second guide rails) 371, 372. The side plates 351, 352 and the guide rails 371, 372 extend along two parallel edges of the base 33, which are generally parallel to each other and extend in a direction generally parallel to a moving direction (sliding direction) of the slider 51. The side plates 351, 352 limit the moving direction of the slider 51. The guide rails 371, 372 slidably support the slider 51 from the lower side of the slider 51.

The base 33 of the housing 31 includes a base surface 34, along which the slider 51 slides. In the housing 31 of the present embodiment, the base surface 34 is generally parallel to the moving direction of the spool 7. The base 33 includes a circuit board receiving chamber 39 on an opposite side of the base 33, which is opposite from the base surface 34 in a direction perpendicular to a plane of the base surface 34. The circuit board receiving chamber 39 is surrounded by an outer wall 38. The circuit board receiving chamber 39 receives a circuit board, on which Hall elements H1-H3 (serving as a stationary sensor 71) and a transmission control unit (TCU) 75 are provided.

As shown in FIGS. 1A-1C and 4A-4E, the slider 51, which is configured into a rectangular plate form, is fixed to one end part of the input shaft 52. In other words, the input shaft 52 projects from a plate surface of the slider 51.

The slider 51 includes six surfaces, i.e., an exposed surface (bottom surface) 53, a sensor surface 54, side surfaces (first and second side surfaces) 551, 552 and slider end surfaces (first and second slider end surfaces) 561, 562. The input shaft 52 is fixed to the exposed surface 53. The sensor surface 54 is placed opposite from the exposed surface 53 in a direction perpendicular to a plane of the exposed surface 53, and a movable sensor 72 is embedded in the sensor surface 54. The side surfaces 551, 552 of the slider 51 extend along the side plates 351, 352, respectively, of the housing 31 in the moving direction of the slider 51. The slider end surfaces 561, 562 are directed in the moving direction of the slider 51 and are opposed to each other.

A plurality of magnets M1-M3, which form the movable sensor 72 discussed later in detail, is provided in an inside of the slider 51. Specifically, the slider 51 can receive the magnets M1-M3 therein by, for example, forming the slider 51 as a plastic magnet, which is formed by, for example, mixing iron powder in polyphenylene sulfide (PPS).

The input shaft 52 is fitted in a groove 7b of the spool 7 (see FIG. 3). When a manipulation force (operational force) F is applied from the spool 7 to a point of action Q of the input shaft 52, the slider 51 is slid in response to the movement of the spool 7. In this way, as shown in FIGS. 6A to 6D, the slider 51 is moved to the corresponding position, which corresponds to the selection of the shift range among the P-range, the R-range, the N-range and the D-range.

Furthermore, the rotation of the detent plate 12 is limited during the non-manipulation time period of the shift lever, so that the movement of the slider 51 is limited at the corresponding position, which corresponds to the selected shift range.

Figure 5:
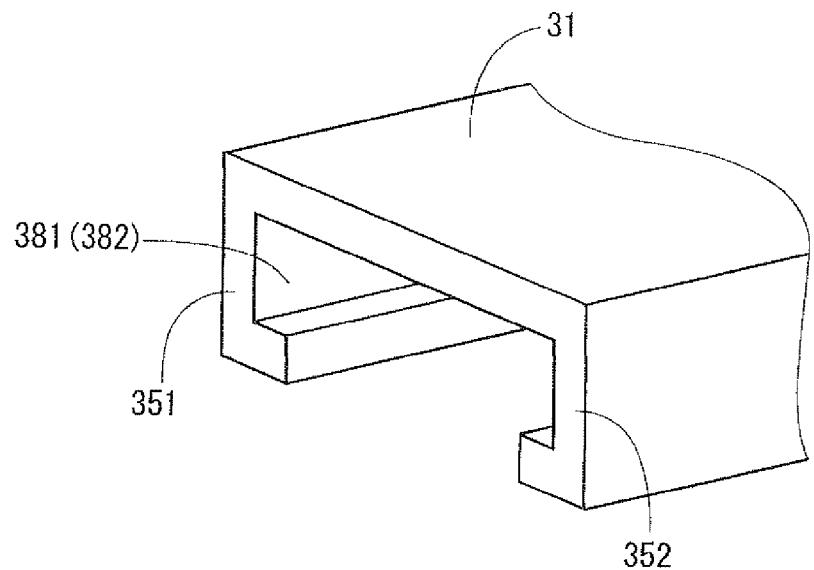
FIG. 5 is a partial perspective view showing an open end of a housing of the first embodiment.

In the present embodiment, as shown in FIG. 5, open ends 381, 382 are provided in two end surfaces, respectively, of the housing 31, which are generally perpendicular to the moving direction of the slider 51. Thus, as shown in FIG. 6A, when the P-range is selected, the slider end surface 561 of the slider 51 projects outward from the open end 381 of the housing 31. Furthermore, as shown in FIG. 6D, when the D-range is selected, the slider end surface 562 of the slider 51 projects outward from the open end 382 of the housing 31.

Next, a position sensor (displacement sensing means) 70 of the range sensing apparatus will be described with reference to FIGS. 7 to 10. The position sensor 70, which serves as the displacement sensing means, includes the stationary sensor 71 and the movable sensor 72. The movable sensor 72 includes the magnets, and the stationary sensor 71 includes the magnetic sensing elements, which sense a change in the magnetic field (magnetism) generated by the magnets. Thus, the displacement of the slider 51 can be sensed without requiring a contact between the stationary sensor 71 and the movable sensor 72. That is, the position sensor 70 is of the non-contact type, i.e., contactless type (the displacement sensing means of the non-contact type).

Figure 7:
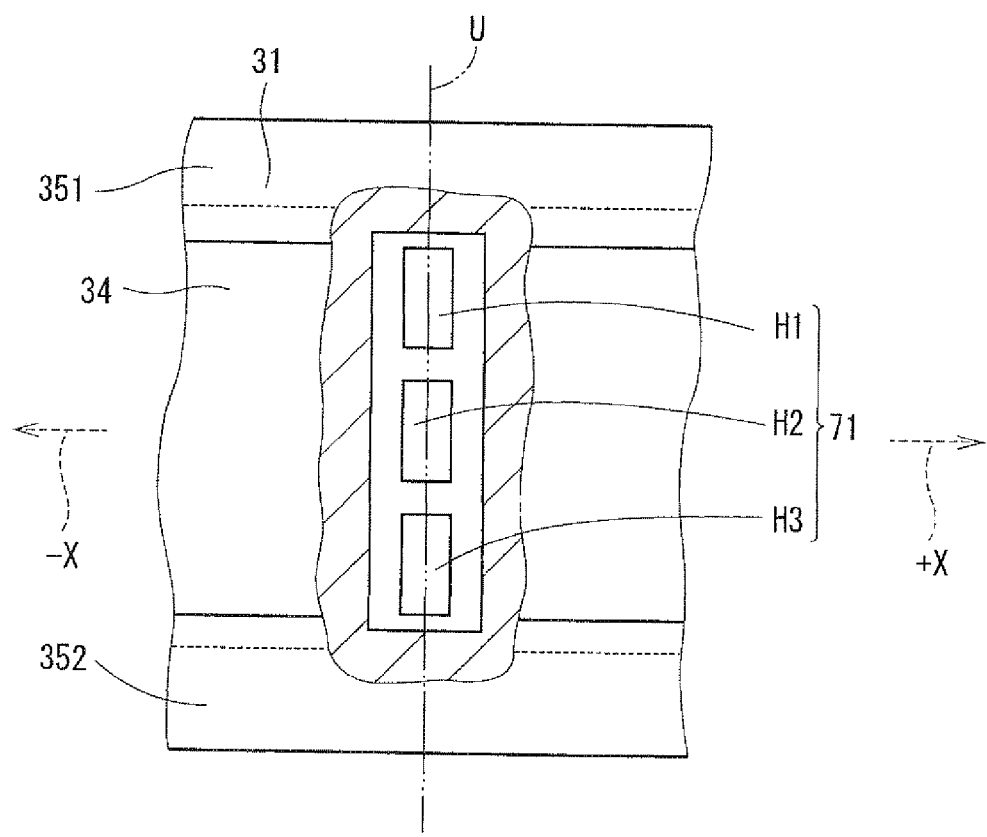
FIG. 7 is a partial cross-sectional view showing a stationary sensor of a position sensor (displacement sensing means) of the first embodiment.

As shown in FIG. 7, the magnetic sensing elements of the stationary sensor 71 include three Hall elements H1, H2, H3, which are embedded in the base 33 of the housing 31. The Hall elements H1-H3 are arranged one after another at generally equal intervals in a direction perpendicular to the moving direction of the slider 51. An imaginary line, which connects the Hall elements H1-H3, forms a sensing line U.

Figure 8:
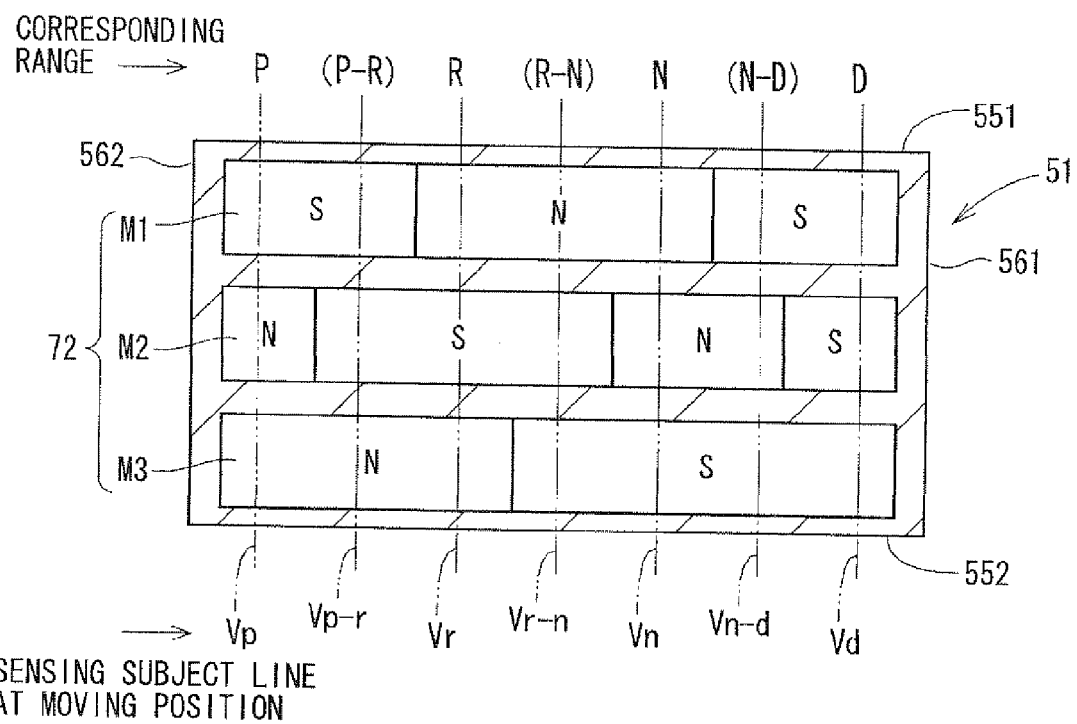
FIG. 8 is a plan view showing a movable sensor of the position sensor (displacement sensing means) of the first embodiment.

As shown in FIG. 8, the magnets of the movable sensor 72 include three magnets M1, M2, M3, which are arranged one after another at generally equal intervals in a direction parallel to the slider end surfaces 561, 562 of the slider 51. The locations of the magnets M1-M3 correspond to the locations of the Hall elements H1-H3, respectively, of the housing 31. The magnets M1-M3 are elongated toward both of the slider end surfaces 561, 562 and are magnetized to have different magnetization patterns of the S- and N-poles.

An imaginary line, which overlaps with the sensing line U of the stationary sensor 71 at the moving position of the slider 51 that corresponds to the P-range, is referred to as a sensing subject line Vp. An imaginary line, which overlaps with the sensing line U of the stationary sensor 71 at the moving position of the slider 51 that corresponds to the R-range, is referred to as a sensing subject line Vr. An imaginary line, which overlaps with the sensing line U of the stationary sensor 71 at the moving position of the slider 51 that corresponds to the N-range, is referred to as a sensing subject line Vn. An imaginary line, which overlaps with the sensing line U of the stationary sensor 71 at the moving position of the slider 51 that corresponds to the D-range, is referred to as a sensing subject line Vd. Furthermore, an imaginary line, which corresponds to a midpoint between the position (the sensing subject line Vp) of the P-range and the position (the sensing subjection line Vr) of the R-range, is referred to as a subject sensing line Vp-r. Also, an imaginary line, which corresponds to a midpoint between the position (the sensing subject line Vr) of the R-range and the position (the sensing subjection line Vn) of the N-range, is referred to as a subject sensing line Vr-n. In addition, an imaginary line, which corresponds to a midpoint between the position (the sensing subject line Vn) of the N-range and the position (the sensing subjection line Vd)

of the D-range, is referred to as a subject sensing line Vn-d. The combinations of the S- and N-poles of the magnets M1-M3 along these seven sensing subject lines Vp, Vp-r, Vr, Vr-n, Vn, Vn-d, Vd are different from one another.

Each of the Hall elements H1-H3 outputs an ON voltage when a corresponding portion of the sensing line U located at this Hall element H1-H3 overlaps with the S-pole. Furthermore, the output of each of the Hall elements H1-H3 becomes OFF (OFF voltage) when the corresponding portion of the sensing line U located at this Hall element H1-H3 overlaps with the N-pole. Therefore, as indicated in a pattern diagram of FIG. 10, a combination of ON and OFF of the Hall elements H1-H3 corresponds to the associated one of the shift range positions, thereby resulting in the one-to-one relationship between the combination of ON and OFF and the shift range position.

Figure 9:
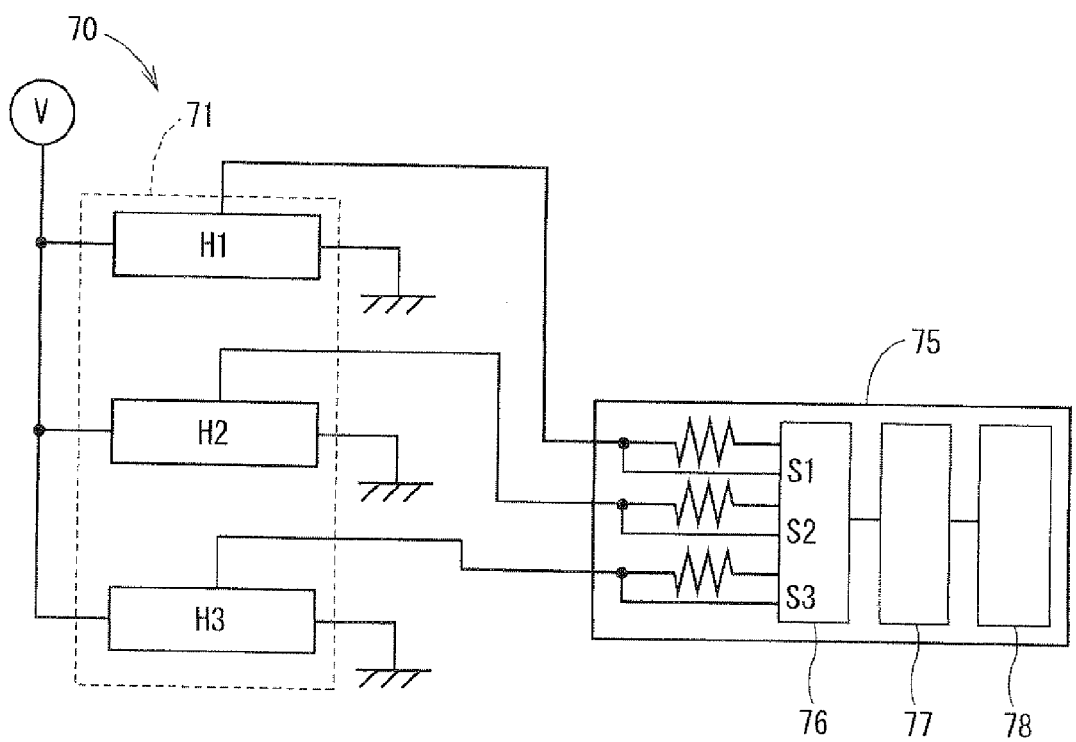
FIG. 9 is a block diagram showing a circuit of the position sensor (displacement sensing means) of the first embodiment.
Figures 10, 11:
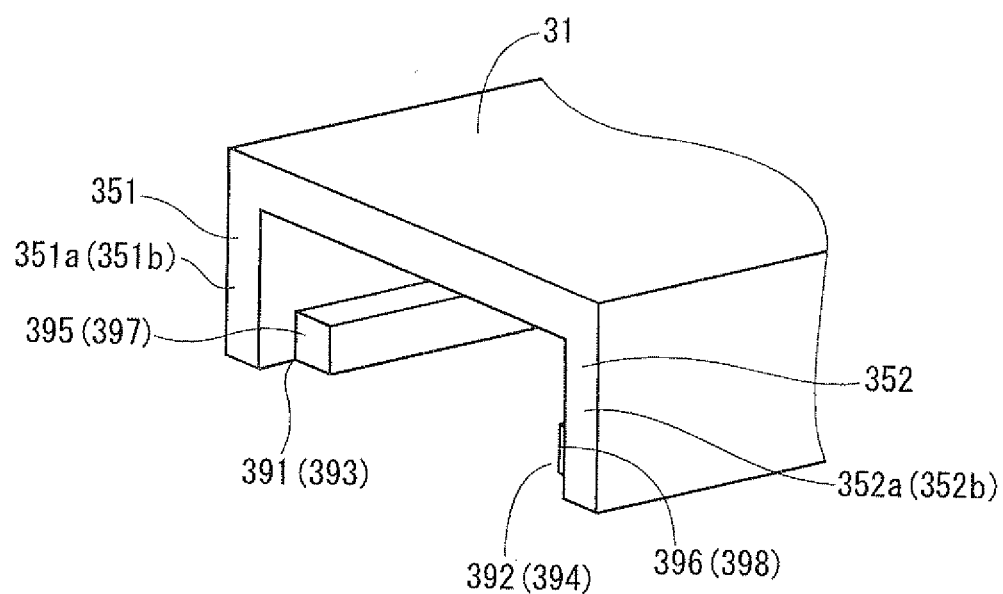
FIG. 10 is a diagram showing patterns used for determining the shift range in the position sensor (displacement sensing means) of the first embodiment.
FIG. 11 is a partial perspective view showing notches of guide rails of a range sensing apparatus according to a second embodiment of the present invention.

As shown in FIG. 9, each of the Hall elements H1-H3 of the stationary sensor 71 of the position sensor 70 outputs the ON-voltage discussed above to the TCU 75. In FIG. 9, reference sign V indicates an electric power source. The TCU 75 includes a voltage sensing section (voltage sensing means) 76, a pattern determining section (pattern determining means) 77 and a range determining section (range determining means) 78. The voltage sensing section 76 senses signals S1-S3, which are based on the outputs of the Hall elements H1-H3. The pattern determining section 77 determines the pattern according to the pattern diagram of FIG. 10 based on the signals S1-S3, and the range determining section 78 determines the shift range based on the determined pattern, which is determined at the pattern determining section 77. In FIG. 10, each open circle (blank circle) indicates the ON voltage.

Now, an operation will be described. When the driver (user) of the vehicle selects the shift range through the shift lever, the spool 7, which is fitted into the spool hole 6a of the valve body 6 of the hydraulic pressure control apparatus 20, is reciprocated (displaced). Thereby, the hydraulic pressure control apparatus 20 controls the hydraulic pressure, which is supplied to the respective frictional elements, and the slider 51 of the range sensing apparatus 30 is slid to follow the reciprocal movement of the spool 7.

At this time, the hydraulic fluid, which is sprayed in the inside of the oil pan 4 to lubricate and cool the corresponding components, may be also applied to the range sensing apparatus 30. The housing 31, which covers the upper and lateral sides of the slider 51, limits intrusion of the hydraulic fluid and foreign objects to the guide rails 371, 372. Furthermore, in a case where the hydraulic fluid and foreign objects adhere to the guide rails 371, 372, the hydraulic fluid and foreign objects, which adhere to the guide rails 371, 372, are collected by the slider end surfaces 561, 562 of the slider 51 through the reciprocal movement of the slider 51 and are expelled to the outside of the housing 31 through the open ends 381, 382.

The position sensor 70 of the range sensing apparatus 30 outputs each corresponding ON voltage, which corresponds to the moving position of the slider 51, to the TCU 75, and the TCU 75 determines the selected shift range.

Next, advantages of the range sensing apparatus 30 of the first embodiment will be described.

(1) The housing 31 covers the upper and lateral sides of the movable range of the slider 51. Thereby, it is possible to limit the intrusion of the hydraulic fluid and foreign objects into the movable range of the slider 51 from the upper side and the lateral sides thereof, and thereby it is possible to limit the adhesion of the hydraulic fluid and foreign objects to the guide rails 371, 372. As a result, it is possible to limit the malfunction of the slider 51.

(2) In the case where the hydraulic fluid and foreign objects adhere to the guide rails 371, 372, the slider 51, which reciprocates along the guide rails 371, 372, collects the hydraulic fluid and foreign objects at the ends of the movable range of the slider 51. The collected hydraulic fluid and foreign objects are then expelled to the outside of the housing 31 through the open ends 381, 382 of the housing 31. In this way, the malfunction of the slider 51 can be limited.

(3) in the case where the cover is installed to the slit or in the case where the multiple holes are provided to expel the foreign objects like in the prior arts discussed in the background section, the additional component or the additional processing steps are required, and thereby the manufacturing costs may be disadvantageously increased. In contrast, according to the first embodiment, the housing 31 limits the hydraulic fluid and foreign objects, which are moved downward from the upper side. Furthermore, in the case where the hydraulic fluid and foreign objects enter into the inside of the housing 31, the hydraulic fluid and foreign objects in the inside of the housing 31 can be expelled to the outside of the housing 31 through the open ends 381, 382 upon the reciprocal movement of the slider 51. In this way, the additional component or the complicated process are not required, so that an increase in the manufacturing costs can be limited.

(4) The position sensor 70 is the non-contact type (non-contact type displacement sensing means). Therefore, in comparison to the position sensor of the contact type (contact type displacement sensing means), which senses the displacement of the slider through electrical contact at contacts, it is possible to eliminate disadvantages, such as wearing of the contacts.

Second Embodiment

Next, a second embodiment of the present invention will be described with reference to FIGS. 11 to 12D. The second embodiment differs from the first embodiment with respect to a configuration of the housing 31. In the following description, components, which are similar to those of the first embodiment, will be indicated by the same reference numerals and will not be described further.

In the second embodiment, notches (recesses) 391, 392, 393, 394 are provided in the guide rails 371, 372 at the end parts of the movable range of the slider 51 to communicate between the movable range of the slider 51 and the outside of the housing 31 (see FIG. 11). In other words, each of two opposed end surfaces (guide rail end surfaces) 395, 396, 397, 398 of each guide rail 371, 372 is axially inwardly recessed from an adjacent end surface 351a, 351b, 352a, 352b of the corresponding side plate 351, 352. In the case where the P-range is selected as shown in FIG. 12A, the slider end surface 561 of the slider 51 projects in the second direction −X from the guide rail end surfaces 395, 396 of the guide rails 371, 372, which are located at ends of the guide rails 371, 372 in the second direction −X and are adjacent to the end surfaces 351a, 352a of the side plates 351, 352, In the case where the D-range is selected as shown in FIG. 12D, the slider end surface 562 of the slider 51 projects in the first direction +X from the guide rail end surfaces 397, 398 of the guide rails 371, 372, which are located at ends of the guide rails 371, 372 in the first direction +X and are adjacent to the end surfaces 351b, 352b of the side plates 351, 352.

In the second embodiment, advantages, which are similar to those discussed in the sections (1), (3) and (4) of the first embodiment, can be achieved. Furthermore, in the case where the hydraulic fluid and/or foreign objects adhere to the side surfaces 551, 552, when the slider 51 reciprocates along the guide rails 371, 372, the hydraulic fluid and/or foreign objects can be moved to the notches 391, 392, 393, 394 and expelled to the outside of the housing 31. In this way, the malfunction of the slider 51 can be limited.

In addition, at each of the ends of the movable range of the slider 51, the corresponding slider end surface 561, 562 does not project to the outside of the housing 31 unlike the first embodiment. In this way, the hydraulic fluid and/or foreign objects will not adhere to the top surface of the slider 51, and the intrusion of the hydraulic fluid and/or foreign objects into the inside of the housing 31 can be limited.

Third Embodiment

Next, a third embodiment of the present invention will be described with reference to FIGS. 13A to 16. In the third embodiment, the position sensor (displacement sensing means) is different from that of the first embodiment. Other than the position sensor, the rest of the structure of the range sensing apparatus of the third embodiment is substantially the same as that of the first embodiment. In the third embodiment, the position sensor 80, which is indicated in FIG. 15 and serves as the displacement sensing means, includes a stationary sensor 81 and a movable sensor 82. The stationary sensor 81 includes electrode plates, and the movable sensor 82 includes terminals, each of which has a contact point that contacts a corresponding one of the electrode plates of the stationary sensor 81. Thus, the displacement of the slider 51 can be sensed through the contact between the stationary sensor 81 and the movable sensor 82. That is, the position sensor 80 is the contact type sensor (contact type displacement sensing means).

Figure 13A:
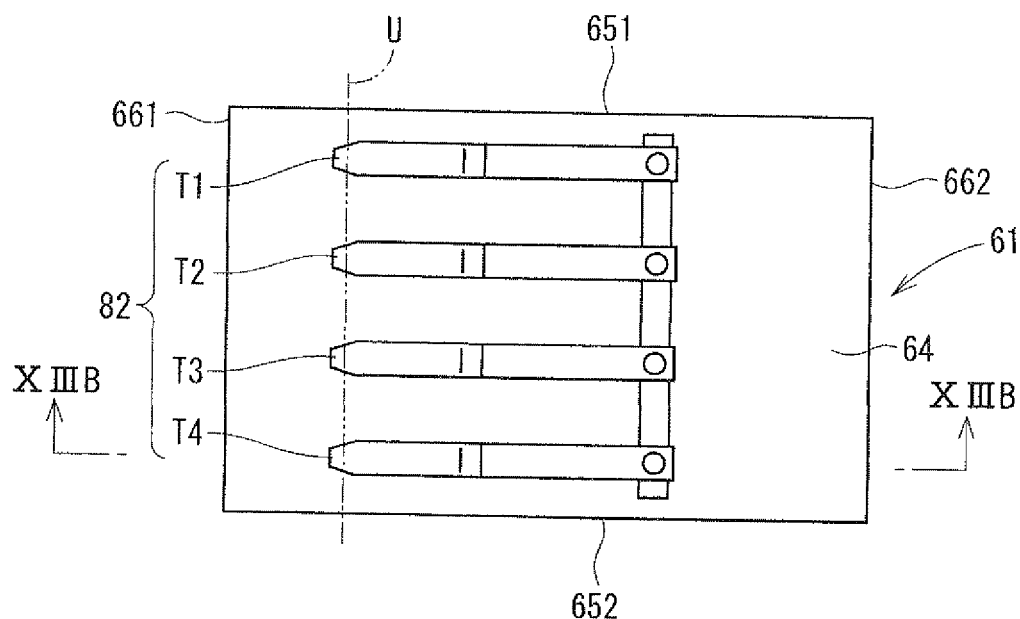
FIG. 13A is a plan view of a position sensor (specifically, a movable sensor) according to a third embodiment of the present invention.
Figure 13B:
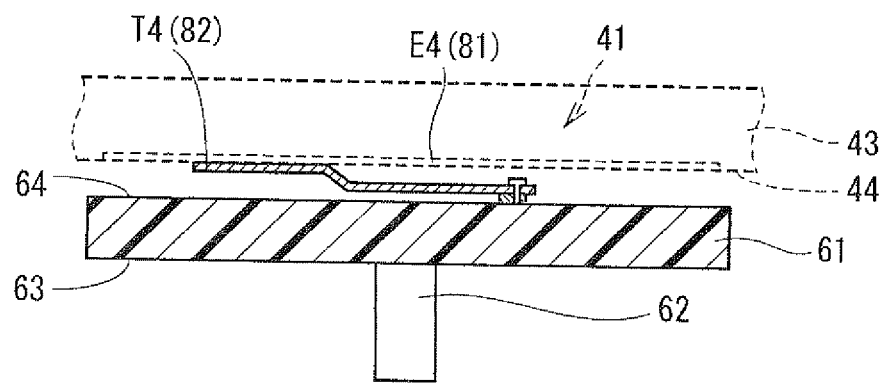
FIG. 13B is a cross-sectional view taken along line XIIIB-XIIIB in FIG. 13A.

The housing 41 is similar to the housing 31 of the first embodiment except the structure of the stationary sensor 81. That is, similar to the housing 31 of the first embodiment, the housing 41 includes a base (top plate) 43, side plates (first and second side plates) 451, 452 and guide rails (first and second guide rails) 471, 472. The side plates 451, 452 and the guide rails 471, 472 extend along two parallel edges of the base 43, which are generally parallel to each other and extend in a direction that is generally parallel to a moving direction of a slider 61. As shown in FIGS. 13A and 13B, the slider 61 has an input shaft 62, which projects from an exposed surface (bottom surface) 63 of the slider 61, like in the first embodiment. Furthermore, four terminals T1, T2, T3, T4 are installed to a sensor surface 64 of the slider 61, which is opposed to a base surface 44 of a housing 41. Proximal end parts of the terminals T1-T4 are fixed to the sensor surface 64 of the slider 61, and the terminals T1-T4 are arranged one after another at generally equal intervals in a direction parallel to slider end surfaces 661, 662 of the slider 61, which are generally perpendicular to side surfaces 651, 652 of the slider 61. The terminals T1-T4 form the movable sensor 82. An imaginary line, which connects the distal end parts of the terminals T1-T4, forms the sensing line U.

Figure 14:
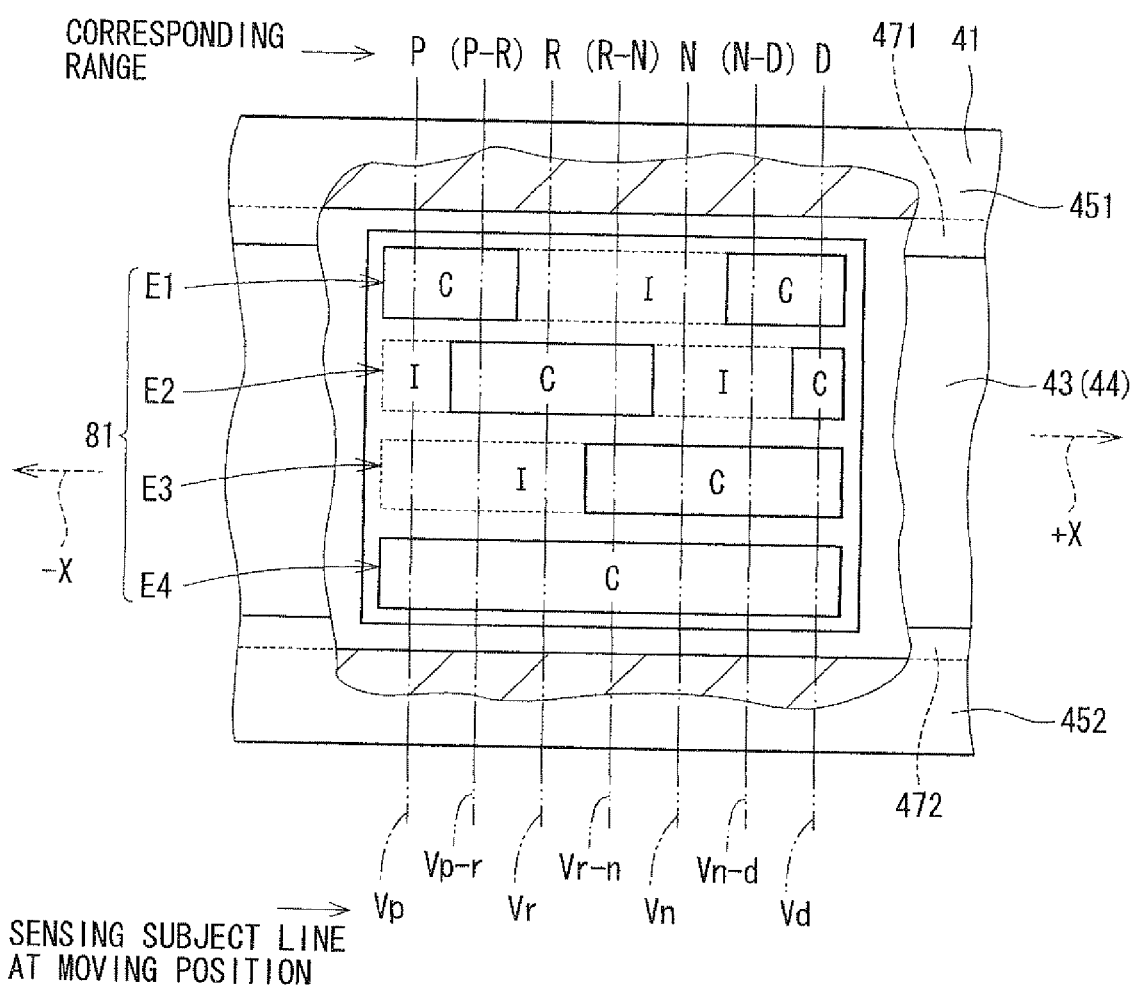
FIG. 14 is a partially fragmented schematic view showing a position sensor (more specifically, a stationary sensor) according to the third embodiment.
Figures 15, 16:
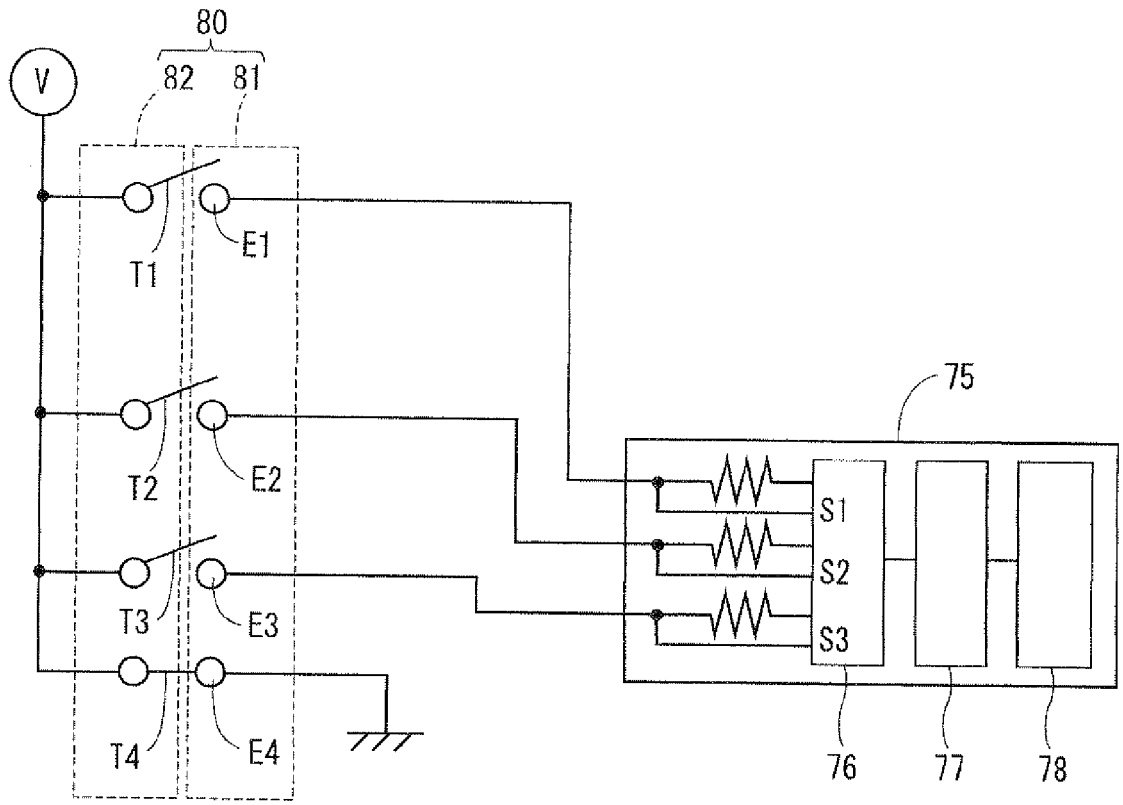
FIG. 15 is a block diagram showing a circuit of the position sensor of the third embodiment.
FIG. 16 is a diagram showing patterns used for determining the shift range in the position sensor of the third embodiment.

As shown in FIG. 14, four electrode plates E1, E2, E3, E4 of the stationary sensor 81 are embedded in the base 43 of the housing 41 while exposing contact surfaces of the electrode plates E1, E2, E3, E4 from the base surface 44 of the base 43. The electrode plates E1-E4 are arranged one after another at generally equal intervals in the direction generally perpendicular to the sliding direction of the slider 61. The locations of the electrode plates E1-E4 respectively correspond to the locations of the terminals T1-T4 of the slider 61. The electrode plates E1-E4 are elongated in the sliding direction of the slider 61. The electrode plates E1-E3 are formed to have different patterns of an electrically conductive portion C and a dielectric portion I. The electrode plate E4 includes only the conductive portion C and is grounded, as shown in FIG. 15.

An imaginary line, which overlaps with the sensing line U of the movable sensor 82 at the moving position of the slider 61 that corresponds to the P-range, is referred to as the sensing subject line Vp. An imaginary line, which overlaps with the sensing line U of the movable sensor 82 at the moving position of the slider 61 that corresponds to the R-range, is referred to as the sensing subject line Vr. An imaginary line, which overlaps with the sensing line U of the movable sensor 82 at the moving position of the slider 61 that corresponds to the N-range, is referred to as the sensing subject line Vn. An imaginary line, which overlaps with the sensing line U of the movable sensor 82 at the moving position of the slider 61 that corresponds to the O-range, is referred to as the sensing subject line Vd. Furthermore, an imaginary line, which corresponds to a midpoint between the position (the sensing subject line Vp) of the P-range and the position (the sensing subjection line Vr) of the R-range, is referred to as a subject sensing line Vp-r. Also, an imaginary line, which corresponds to a midpoint between the position (the sensing subject line Vr) of the R-range and the position (the sensing subjection line Vn) of the N-range, is referred to as a subject sensing line Vr-n. In addition, an imaginary line, which corresponds to a midpoint between the position (the sensing subject line Vn) of the N-range and the position (the sensing subjection line Vd) of the D-range, is referred to as a subject sensing line Vn-d. The combinations of the electrically conductive portion C and/or the dielectric portion I along these seven sensing subject lines Vp, Vp-r, Vr, Vr-n, Vn, Vn-d, Vd are different from one another.

The distal end parts of the terminals T1-T4 contact the electrode plates E1-E4, respectively. When the distal end part of each of the terminals T1-T4, i.e., the sensing line U contacts the electrically conductive portion C of the corresponding one of the electrode plates E1-E4, the ON voltage is outputted. In contrast, when the distal end part of each of the terminals T1-T4, i.e., the sensing line U contacts the dielectric portion I of the corresponding one of the electrode plates E1-E4, the output becomes OFF. Therefore, as indicated in a pattern diagram of FIG. 16, a combination of ON and OFF between each of the terminals T1-T4 and the corresponding one of the electrode plates E1-E4 corresponds to the associated one of the shift range positions, thereby establishing the one-to-one relationship between the combination of ON and OFF and the shift range position.

As shown in FIG. 15, the position sensor 80 outputs the ON voltage discussed above to the TCU 75. In FIG. 15, the reference sign V indicates the electric power source. The TCU 75 includes the voltage sensing section (voltage sensing means) 76, the pattern determining section (pattern determining means) 77 and the range determining section (range determining means) 78. The voltage sensing section 76 senses the signals S1-S3 based on the output of the position sensor 80. The pattern determining section 77 determines the pattern according to the pattern diagram of FIG. 16 based on the signals S1-S3, and the range determining section 78 determines the shift range based on the determined pattern, which is determined at the pattern determining section 77. In FIG. 16, each open circle (blank circle) indicates the ON voltage.

Even in the third embodiment, the housing 41 covers the guide rails 471, 472 of the slider 61 from the upper side and the lateral sides. In this way, the adhesion of the foreign objects to the guide rails 471, 472 can be limited, and an advantage, which is similar to the advantage discussed in the section (1) of the first embodiment, can be achieved.

Now, modifications of the above embodiments will be described.

In the above embodiments, the housing 31 is placed generally parallel to the base surface 34. However, the orientation of the housing 31 is not limited to this. That is, the housing 31 may be tilted as long as an angle, which is defined between the moving direction of the slider 51 and the horizontal direction, is equal to or less than 90 degrees.

In the above embodiments, the input shaft 52, 62 of the slider 51, 61 projects in the vertical direction, which is vertical to the exposed surface 53, 63 of the slider 51, 61. However, the projecting direction of the input shaft 52, 62 is not limited to this. For instance, the input shaft 52, 62 may be tilted relative to the exposed surface 53, 63 of the slider 51, 61 to enable visual confirmation of the engagement between the groove 7b of the spool 7 and the input shaft 52, 62.

The position sensor (displacement sensing means) of the third embodiment may be used in the second embodiment. In such a case, an advantage, which is similar to the advantage discussed in the section (1) of the first embodiment, can be achieved.

In the second embodiment, in the case of the P-range, the slider end surface 561 of the slider 51 may be placed at the same location as that of the guide rail end surfaces 395, 396 of the guide rails 371, 372, which are located at the ends of the guide rails 371, 372 in the second direction –X. In such a case, an advantage, which is similar to the advantage discussed in the section (2) of the first embodiment, can be achieved. Furthermore, in the case of the D-range, the slider end surface 562 of the slider 51 may be placed at the same location as that of the guide rail end surfaces 397, 398 of the guide rails 371, 372, which are located at ends of the guide rails 371, 372 in the first direction +X. In such a case, an advantage, which is similar to the advantage discussed in the section (2) of the first embodiment, can be achieved.

As components of the stationary sensor of the non-contact type position sensor, magnetoresistive elements may be used in place of the Hall elements.

As discussed above, the present invention is not limited the above embodiments and modifications thereof, That is, the above embodiments and modifications thereof may be modified in various ways without departing from the sprit and scope of the invention.

What is claimed is:

1. A range sensing apparatus for an automatic transmission, wherein the range sensing apparatus is placed in a corresponding location, which is to be exposed to hydraulic fluid in the automatic transmission, the range sensing apparatus comprising:
   an input shaft, to which a manipulation force is applied according to selection of a shift range of the automatic transmission, wherein the input shaft is installed in an inside of the automatic transmission;
   a slider, to which one end part of the input shaft is fixed, wherein the slider reciprocates together with the input shaft;
   a housing, which slidably guides the slider; and
   a position sensor that senses the shift range of the automatic transmission based on a relative position between a movable device, which reciprocates together with the slider, and a stationary device, which is provided to the housing, wherein the housing includes:
      a top plate that covers an upper side of the slider;
      first and second side plates that project downward from first and second edges, respectively, of the top plate, which extend generally parallel to a moving direction of the slider, wherein the first and second side plates cover first and second lateral sides, respectively, of the slider; and
      first and second guide rails that are provided at lower end parts, respectively, of the first and second side plates to slidably support the slider from a lower side of the slider, wherein:
   when the slider is placed at one end of a movable range of the slider relative to the housing in the moving direction of the slider at the time of selecting the shift range of the automatic transmission, one end of the slider in the moving direction of the slider projects outward from an open end of the housing.

2. The range sensing apparatus according to claim 1, wherein the input shaft is provided in a bottom surface of the slider.

3. The range sensing apparatus according to claim 2, wherein:
   the movable device generates a magnetism; and
   the stationary device senses the magnetism generated by the movable device.

4. The range sensing apparatus according to claim 1, wherein:
   the movable device generates a magnetism; and
   the stationary device senses the magnetism generated by the movable device.

5. A range sensing apparatus for an automatic transmission, wherein the range sensing apparatus is placed in a corresponding location, which is to be exposed to hydraulic fluid in the automatic transmission, the range sensing apparatus comprising:
   an input shaft, to which a manipulation force is applied according to selection of a shift range of the automatic transmission, wherein the input shaft is installed in an inside of the automatic transmission;
   a slider, to which one end part of the input shaft is fixed, wherein the slider reciprocated together with the input shaft;
   a housing, which slidably guides the slider; and
   a position sensor that senses the shift range of the automatic transmission based on a relative position between a movable device, which reciprocates together with the slider, and a stationary device, which is provided to the housing, wherein the housing includes:
      a top plate that covers an upper side of the slider;
      first and second side plates that project downward from first and second edges, respectively, of the top plate, which extend generally parallel to a moving direction of the slider, wherein the first and second side plates cover first and second lateral sides, respectively, of the slider; and
      first and second guide rails that are provided at lower end parts, respectively, of the first and second side plates to slidably support the slider from a lower side of the slider, wherein
   a notch is formed in one end part of each of the first and second guide rails in the moving direction of the slider, which is defined by the first and second side plates to communicate between a movable range of the slider and an outside of the housing; and
   an axial end surface of the one end part of each of the first and second guide rails is axially inwardly recessed away from an adjacent axial end surface of a corresponding one of the first and second side plates in the moving direction of the slider due to presence of the notch.

6. The range sensing apparatus according to claim 5, wherein the input shaft is provided in a bottom surface of the slider.

7. The range sensing apparatus according to claim 6, wherein: the movable device generates a magnetism; and the stationary device senses the magnetism generated by the movable device.

8. The range sensing apparatus according to claim 5, wherein: the movable device generates a magnetism; and the stationary device senses the magnetism generated by the movable device.

* * * * *